June 24, 1969  A. H. McINTYRE ET AL  3,451,080

SCREWS

Filed Nov. 23, 1966  Sheet 1 of 4

Fig. 3.
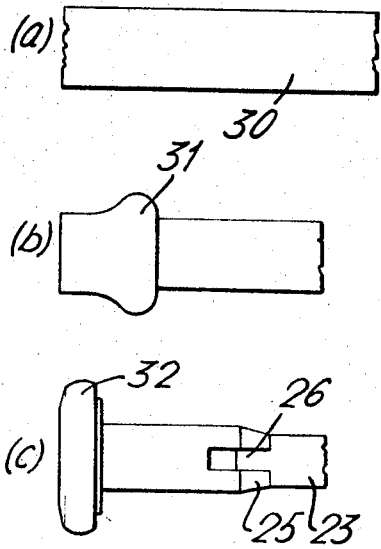
Fig. 4.
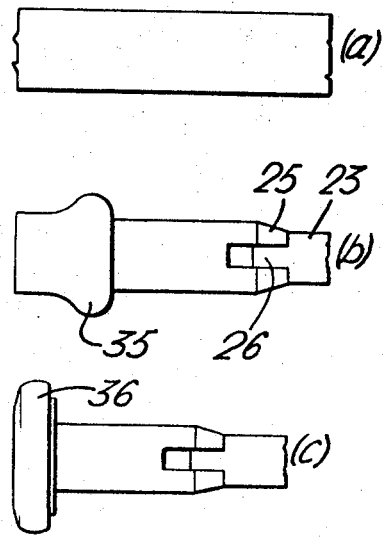
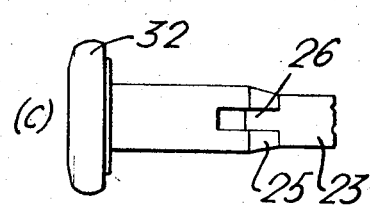
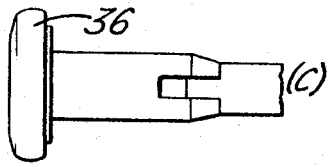
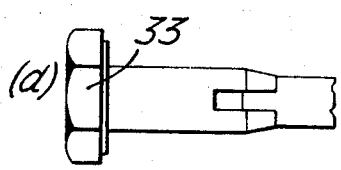
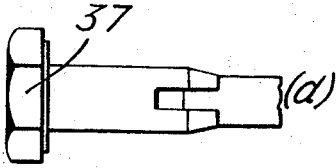
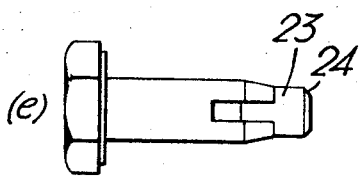
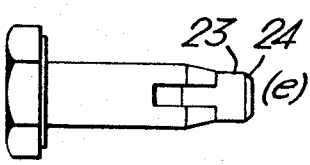
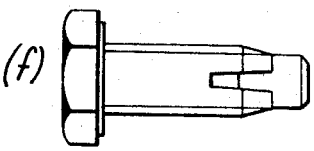
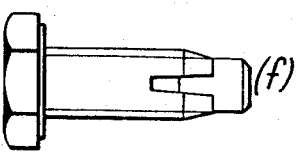

Fig. 5. Fig. 6.
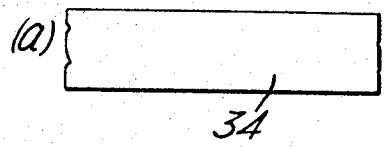
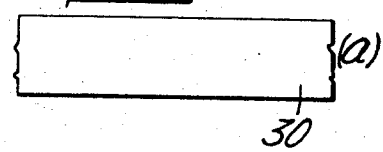
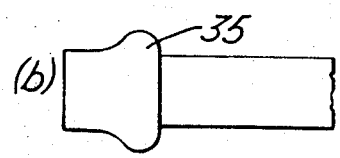
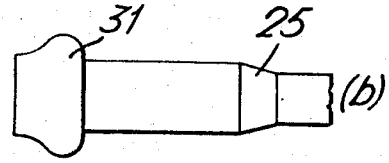
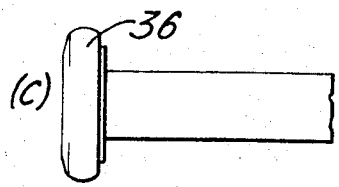
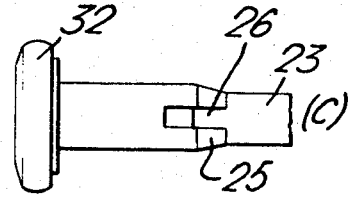
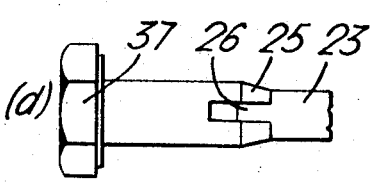
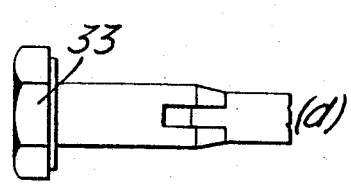
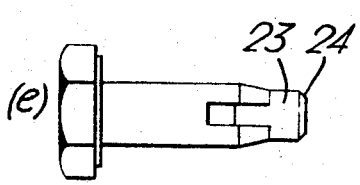
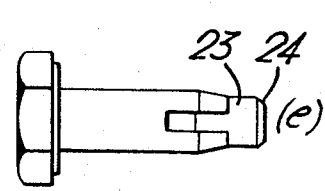
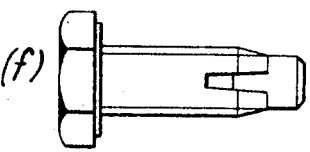
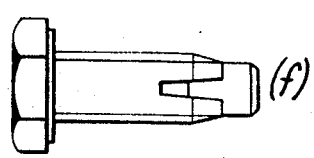

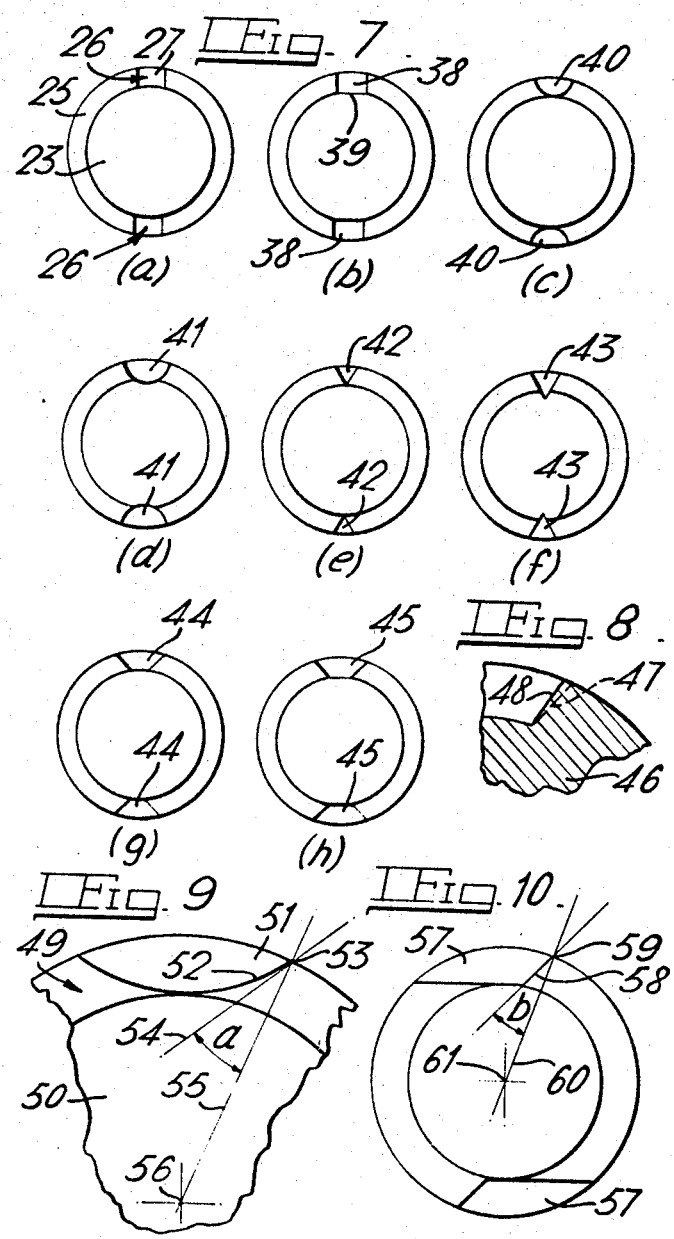

United States Patent Office 3,451,080
Patented June 24, 1969

1

3,451,080
SCREWS
Alan H. McIntyre and William A. Beards, Staffordshire, England, assignors to Glynwed Screws & Fastenings Limited, Midland Works, Darlaston, South Staffordshire, England, a British company
Filed Nov. 23, 1966, Ser. No. 596,645
Claims priority, application Great Britain, Nov. 23, 1965, 49,618/65; Mar. 9, 1966, 10,259/66; Mar. 23, 1966, 12,770/66
Int. Cl. B23g 1/00; F16b 35/00
U.S. Cl. 10—10      24 Claims

ABSTRACT OF THE DISCLOSURE

In making a paint-removing screw the end of a blank is extruded to form a tapered portion terminating in a spigot. At least one groove is extruded in at least the tapered portion. The grooved blank is thread-rolled so that the main portion of the blank and the tapered portion are threaded, but the spigot is not threaded, being too thin. A paint removing edge is formed along the groove or each groove by the thread-rolling process. The extrusion process or processes may be effected while a head is being formed.

---

Figure 1:
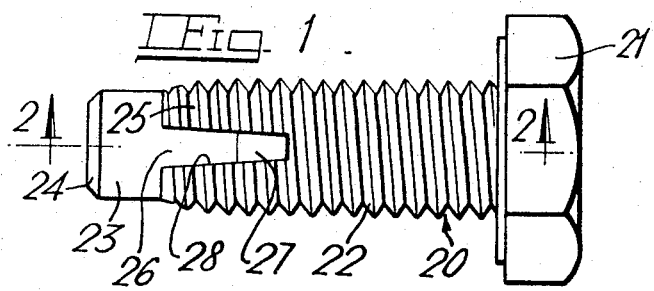

This invention relates to screws, that is to elements comprising externally screw-threaded shanks for engagement with nuts or other internally screw-threaded elements.

The invention is particularly concerned with screws of the kind which will be referred to herein as paint-removing screws, such screws being specially adapted for use with nuts or the like internally screw-threaded members of which the threads have become contaminated or clogged with paint or some other material. There are numerous applications for paint-removing screws. For example, in the manufacture of motor vehicles it has become the practice to secure nuts to vehicle bodies and then to paint the bodies. Components are subsequently secured to the bodies by screws engaging the nuts, and as the nuts are likely to have become contaminated or clogged with paint, paint-removing screws are preferably used. These screws serve to remove paint from the nuts and to secure the components in position. If paint-removing screws are not used it is generally considered necessary to tap the nuts to remove the paint before inserting screws of a standard type.

From one aspect the present invention consists in a method of making a paint-removing screw comprising the steps of extruding the end portion of a blank to form a tapered portion terminating in a locating spigot, extruding a groove or grooves at least in the tapered portion, and thread-rolling the blank so that the main portion of the blank and the tapered portion are threaded but the spigot is not threaded as it is too thin to be threaded, a paint-removing edge being formed along the groove or each of the grooves.

The invention also consists in a paint-removing screw made by this method.

The invention may be applied to screws of any suitable type, such as machine screws, bolts, cap screws, and grub screws.

2

In use, if the screw is introduced into a nut of which the threads are contaminated with paint, the spigot, which is preferably cylindrical in shape, enters the nut first and locates the screw in position. When the screw is then pushed further into the nut and is simultaneously rotated the tapered portion, which is wholly or partially screw-threaded, enters the nut and its threads co-operate with those of the nut. The threads on the tapered portion, particularly those nearer the spigot are blunt in cross-section, lacking crests. As the paint tends to form its thickest deposits at the roots of the threads in the nut, only the outer parts of such deposits are engaged by the leading threads on the screw, and successive layers of the paint are normally stripped from the threads of the nut by successive portions of thread on the screw. The edge-portions of the threads on the tapered portion of the screw bordering the groove or each of the grooves together constitute a broken or interrupted paint-removing edge and serve to cut or push the paint from the threads in the nut. The paint thus removed tends to collect in the groove or grooves.

Figure 2:
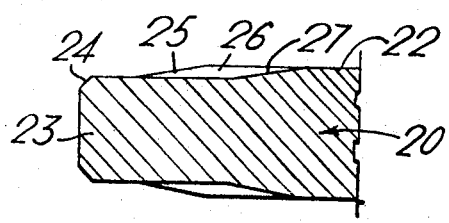
Figure 11:
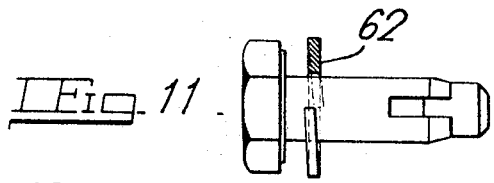
Figure 12:
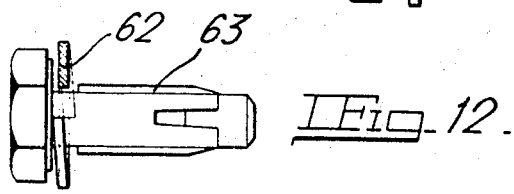

The invention will now be more particularly described with reference to the acompanying drawings, in which:

FIGURE 1 is a side view of a paint-removing screw in accordance with the invention, FIGURE 2 is a section through the right hand part of the screw shown in FIGURE 1, along the line 2—2, but before the thread-rolling operation has been effected, FIGURES 3(a) to 3(f) illustrate the stages in making a screw similar to that shown in FIGURE 1, using a bolt maker, FIGURES 4(a) to 4(f) are similar to FIGURES 3(a) to 3(f) but illustrate a modified method using a two-blow header and other machines, FIGURES 5(a) to 5(f) are similar to FIGURES 4(a) to 4(f) but illustrate a further modification, FIGURES 6(a) to 6(f) are similar to FIGURES 3(a) to 3(f) but illustrate yet another modification, FIGURES 7(a) to 7(h) are somewhat diagrammatic end views of screws immediately before the thread-rolling operation, and illustrate grooves of different cross-sections, FIGURE 8 is a scrap section illustrating the deformation of the side of a groove leading from the paint-removing edge, FIGURE 9 is part of an end view similar to those of FIGURES 7(a) to 7(h) but to a larger scale, and illustrates a preferred feature, FIGURE 10 is a further end view similar to those of FIGURES 7(a) to 7(h), but to a larger scale, and illustrates a preferred feature, and FIGURES 11 and 12 illustrate successive stages in the manufacture of a screw in accordance with the invention, and having a captive washer.

The paint-removing screw shown in FIGURE 1 comprises a shank 20 with a hexagon head 21, the main portion 22 of the shank having a conventional screw-thread rolled on it. A locating spigot 23 is formed at that end of the shank remote from the head 21, the spigot being cylindrical in shape and of a diameter slightly less than the root diameter of the thread on the main portion 22 of the shank. The end of the locating spigot 23 is chamfered as shown at 24. Between the spigot 23 and the main portion 22 of the shank is a tapered portion 25 which has been formed with a partial or incomplete thread during the thread-rolling operation. A pair of diametrically opposed grooves 26 (only one of which is visible in FIGURE 1) are formed in the screw, leading from the spigot through the tapered portion 25 and extending a short way into the main portion 22. The base of each groove forms a continuation of the surface of the spigot 23 throughout the length of the tapered portion 25, and then tapers outwards as shown at 27 to meet the main portion 22 of the shank. Although not shown in FIGURE 1 a partial or incomplete screw thread is rolled on the tapered part 27 during the thread-rolling operation.

The tapered portion 25 and the grooves 26 are formed by an extrusion process before the thread-rolling operation. The shape of the grooves 26 before thread-rolling is illustrated in FIGURE 2. Each groove is initially parallel-sided, but becomes somewhat tapered during the thread-rolling operation due to there being more metal flowing into the groove from the deeper end thereof than from the shallower end near the spigot 23.

The screw operates in use in the manner hereinbefore described.

Screws of the kind shown in FIGURE 1 may be made in a number of ways. Some typical methods are illustrated in FIGURES 3 to 6. FIGURES 3(a) to 3(f) illustrate a sequence of steps in making a screw on a bolt-making machine. A slug 30 is cut from a length of wire as shown in FIGURE 3(a). The slug is subjected to a cold-forging operation whereby one end 31 is upset as shown in FIGURE 3(b). In a second upsetting operation a cheese-head 32 is formed as shown in FIGURE 3(c), and at the same time the spigot 23, tapered portion 25 and grooves 26 are extruded in the blank by forcing the end of the blank into a die of complementary shape. During this step the extrusion is largely completed before the formation of the cheese-head starts, due to there being less resistance afforded by the blank entering the die than that encountered during the upsetting of the head. Then, the cheese-head 32 is trimmed as shown in FIGURE 3(d) to form a hexagon-head 33. In the next step the spigot 23 is machined and chamfered as shown in FIGURE 3(e), and finally a thread is rolled on the blank as shown in FIGURE 3(f).

This method is useful where long runs are required, but for shorter runs the screws may be made on a series of separate machines. A series of stages in the manufacture of a screw is shown in FIGURE 4(a) to (f). Here a slug 34 is cut from a length of wire on a two-blow heading machine, as shown in FIGURE 4(a), and is upset as shown at 35 by the first of the two blows. At the same time the spigot 23, tapered portion 25 and grooves 26 are formed. The second blow completes the cheese-head 36 as shown in FIGURE 4(c). The blank is then passed to a trimming machine which trims the cheese-head 36 to a hexagon head 37 as shown in FIGURE 4(d). The blank is next passed to a "pointing" machine which machines the spigot 23 and forms the chamfer 24. Finally the blank is passed to a thread-rolling machine which rolls a thread on the blank as shown in FIGURE 4(f). A variation of this method is illustrated in FIGURES 5(a) to (f). The only difference between this method and that described above with reference to FIGURES 4(a) to (f) is that the spigot 23, tapered portion 25 and grooves 26 are formed, by extrusion, during the trimming operation, on the trimming machine, as shown in FIGURE 5(d) rather than during the first upsetting stage in the two-blow heading machine.

A modification of the method illustrated in FIGURES 3(a) to (f) is illustrated in FIGURES 6(a) to (f). The only difference between the methods is that in the latter method the grooves 26 are not formed in the tapered portion 25 as the tapered portion is formed, but are extruded during the second upsetting operation, as shown in FIGURES 6(b) and (c).

The angle between the axis of the blank and the straight line lying in the part-conical surface of the tapered portion 25 is normally between 15° and 17°, though it may be as little as 10° or even less. The angle would not normally be higher than 20° as the formation of such a taper would often be impossible when using the preferred single-stage extrusion process. The inclination of the tapered part 27 of the base of each groove 26 is preferably the same as that of the tapered portion 25 of the screw.

FIGURES 7(a) to (h) are diagrammatic end views of screws (omitting their heads) immediately before the thread-rolling operation. FIGURE 7(a) shows grooves 26 of the same shape as those of the screw shown in FIGURE 1 and the blank shown in FIGURE 2. FIGURE 7(b) shows a modification in which there are grooves 38 similar to grooves 26 but having flat bases 39 normal to the sides of the grooves. Extensions of the grooves 38 extend along the spigot in the form of flats. FIGURE 7(c) shows grooves 40 of part-circular cross-section, and FIGURE 7(d) shows grooves 41 similar to grooves 40 but extending further inwards and having extensions forming shallow grooves in the spigot. FIGURES 7(e) and (f) are similar to FIGURES 7(c) and (d) but show V-shaped grooves 42 and 43 respectively. FIGURE 7(g) shows grooves 44 somewhat similar to the grooves 43 shown in FIGURE 7(f) but having bases formed as extensions of the cylindrical surface of the spigot. FIGURE 7(h) shows grooves 45 similar to the grooves 44 shown in FIGURE 7(g) but having flat bases similar to the bases similar to the bases 39 of the grooves 38 shown in FIGURE 7(b).

Although all the grooves illustrated are of uniform cross-section along their lengths this is not essential, and the grooves may be extruded so that each groove is narrower at one end than the other.

The choice of shape for the grooves is to some extent arbitrary but may depend on the size of screw, the material from which it is to be made and the use to which it is to be put. The main function of each groove is firstly to afford a paint-removing edge, and secondarily to receive paint or other material removed from the nut or like component engaged by the screw. The paint-removing edge of the screw shown in FIGURE 1 is broken or interrupted in form and comprises the sharp edge-portions 28 of the thread on the tapered portion 25 bordering the grooves 26. These edge-portions are the ones which reach any part of the nut or like component after the opposite edge-portions when the screw is being inserted. The screw shown in FIGURE 1 has a right-hand thread, but screws with left-hand threads are, of course, within the scope of the invention.

In thread-rolling a blank to form a screw the metal of the blank is deformed and, in addition to the radial and longitudinal movements necessary to form the threads of the screw, metal also moves ahead of the rolling dies in a circumferential direction. It is standard practice to carry out thread-rolling in such a manner that this circumferential movement carries the metal down the thread towards the leading end of the screw; e.g. to an observer looking along a right-hand thread screw from the head the slight circumferential movement of the metal during thread-rolling would be in a clockwise direction.

In carrying out the method in accordance with the invention it will be appreciated that during thread-rolling metal will be carried to the paint-removing edge of the groove or each groove and that this will tend to move the side of the groove leading inwards from the paint-removing edge in such a manner as to reduce the width of the groove. This is illustrated in FIGURE 8 which is a section through a screw 46 at right angles to the axis, and which shows the initial position of the side of a groove in dotted lines 47, and the final position of the side, after thread-rolling at 48.

In order to ensure that the metal at the edge of the groove is well supported during the formation of the paint-removing edge, we prefer to use a blank in which the groove or each groove is so shaped that there is more material present to support the paint-removing edge, as it is formed by the thread-rolling operation, than would be the case if the side of the groove leading inwards from the paint-removing edge lay in a plane containing the axis of the screw.

Typical grooves of this type are shown in FIGURES 7(e), 7(f), 7(g) and 7(h).

Preferably before thread-rolling the side edge of the groove or of each groove leading inwards from the paint-removing edge lies in a plane or is tangential to a plane inclined at an angle of between 30° and 45° to the plane through the paint-removing edge and containing the axis of the screw. This is illustrated in FIGURE 9 which shows a blank 49 with a spigot 50 and groove 51 of a shape similar to the groove 40 in FIGURE 7(c). The side 52 leading inwards from the paint-removing edge 53 is tangential to a plane 54 inclined at an angle $a$ of about 30° to the plane 55 through the paint-removing edge 53 and the axis 56 of the screw. FIGURE 10 illustrates a modification in which there are asymmetrical grooves 57 and in which each groove is such that the side 58 of the groove leading inwards from the paint-removing edge 59 is in a plane inclined at an angle $b$ of about 30° to the plane 60 through the paint-removing edge 59 and containing the axis 61 of the screw.

Although symmetrical grooves are often used, to avoid any possibility of error in manufacture and to make it possible for blanks of the same shape to be used for making both left-hand and right-hand thread screws, this is not essential, and grooves such as the grooves 57 in FIGURE 10 may be of particular use where the grooves are to receive large quantities of paint or other material.

The screws described above are each formed with two grooves, but it is within the scope of the invention to provide a single groove, three grooves or more than three grooves. In general the width of the groove or grooves should be sufficient to receive the paint or other material, but should not be so great that it becomes difficult to bring about the correct engagement between the thread or threads on the screw and the corresponding thread or threads in the nut or like member. Preferably there is an even number of grooves, each groove being diametrically opposite another groove. With this arrangement the screw tends to remain with its axis half-way between the dies during the thread-rolling operation. With an odd number of grooves, or grooves not arranged opposite each other there is a tendency for the screw to move laterally between the thread-rolling dies and for the sides of the groove to collapse.

Each of the screws described above is formed with a single-start thread, but it is within the scope of the invention to provide the screws with multi-start threads.

FIGURE 11 shows a blank of the kind shown in any of FIGURES 3(e), 4(e), 5(e) and 6(e), with a locking washer 62 slipped onto the shank. During thread-rolling a thread 63 is formed on the blank but terminates a short way below the head, and the washer 62 is trapped on the screw by the thread.

We claim:

1. A method of making a paint-removing screw comprising the steps of extruding the end portion of a blank to form a tapered portion terminating in a locating spigot, extruding grooves in at least the tapered portion, and thread-rolling the blank so that the main portion of the blank and the tapered portion are threaded but the spigot is not threaded as it is too thin to be threaded, a paint-removing edge being formed along each of the grooves.

2. A method according to claim 1 in which there is an even number of grooves, each groove being diametrically opposite another groove.

3. A method according to claim 1 in which the tapered portion and the groove are extruded simultaneously in a single operation.

4. A method according to claim 3 in which the screw is formed with a head, and in which a step in the formation of the head is carried out in the same operation as the extrusion.

5. A method according to claim 4 in which the head is formed in a plurality of upsetting operations and the extrusion is effected in the same operation as the initial upsetting of the head.

6. A method according to claim 4 in which the head is formed in a plurality of upsetting operations and the extrusion is effected in the same operation as the final upsetting of the head.

7. A method according to claim 4 in which the head is trimmed in a single operation to form a hexagon, and the extrusion is carried out in the same operation as the trimming of the head.

8. A method according to claim 1 in which the tapered portion is extruded in one operation and the grooves are extruded in a subsequent operation.

9. A method according to claim 8 in which the screw is formed with a head, the head being formed in a plurality of operations and the extrusion being effected in two of the head forming operations.

10. A method according to claim 1 in which the locating spigot is substantially cylindrical and of a diameter substantially equal to the root diameter of the thread on the screw so that in use the spigot can enter freely a nut to be engaged by the thread on the screw, and locate the screw for this engagement.

11. A method according to claim 1 in which each groove, at that end remote from the spigot, becomes gradually less deep until its base merges into the main portion of the shank.

12. A method according to claim 1 in which each groove extends inwards at least as far as the root of the thread on the screw.

13. A method according to claim 12 in which the inner portion of each groove extends along the spigot.

14. A method according claim 1 in which, before thread-rolling each groove has parallel sides lying substantially in planes containing the axis of the screw.

15. A method according to claim 1 in which each groove is so shaped that there is more material present to support the paint-removing edge, as it is formed by the thread-rolling operation, than would be the case if the side of the groove leading inwards from the paint-removing edge lay in a plane containing the axis of the screw.

16. A method according to claim 15 in which before thread-rolling the side of each groove leading inwards from the paint-removing edge lies in a plane or is tangential to a plane inclined at an angle of between 30° and 45° to the plane through the paint-removing edge and containing the axis of the screw.

17. A method according to claim 1 in which the blank is formed with a head and a washer is placed on the blank beneath the head before the thread-rolling operation, the washer being trapped on the screw by the thread-rolling operation.

18. A method according to claim 1 in which, before thread-rolling each groove is U-shaped in cross-section.

19. A method according to claim 1 in which, before thread-rolling each groove is V-shaped in cross-section.

20. A method of making a paint-removing screw comprising the steps of extruding the end portion of a blank to form a tapered portion terminating in a locating spigot, extruding a single groove in at least the tapered portion, and thread-rolling the blank so that the main portion of the blank and the tapered portion are threaded but the spigot is not threaded as it is too thin to be threaded, a paint-removing edge being formed along the groove.

21. A method according to claim 20 in which the tapered portion and the groove are extruded simultaneously in a single operation.

22. A method according to claim 20 in which the screw is formed with a head, and in which a step in the formation of the head is carried out in the same operation as the extrusion.

23. A method according to claim 20 in which the tapered portion is extruded in one operation and the groove means is extruded in a subsequent operation.

24. A method according to claim 23 in which the screw is formed with a head, the head being formed in a plurality of operations and the extrusion being effected in two of the head forming operations.

References Cited

UNITED STATES PATENTS

| | | | |
|---|---|---|---|
| 3,037,221 | 6/1962 | Lanius | 10—10 |
| 3,125,923 | 3/1964 | Hanneman | 85—47 |
| 3,183,531 | 5/1965 | McKewan | 10—10 |

CHARLES W. LANHAM, *Primary Examiner.*

LOWELL A. LARSON, *Assistant Examiner.*

U.S. Cl. X.R.

85—47